(12) United States Patent
Kimijima (10) Patent No.: US 7,516,258 B2
(45) Date of Patent: Apr. 7, 2009

(54) ELECTRONIC APPARATUS AND CONTROL METHOD

(75) Inventor: Yuuichirou Kimijima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 415 days.

(21) Appl. No.: 11/370,976

(22) Filed: Mar. 9, 2006

(65) Prior Publication Data

US 2006/0206637 A1 Sep. 14, 2006

(30) Foreign Application Priority Data

Mar. 11, 2005 (JP) ............................. 2005-070024

(51) Int. Cl.
*G06F 13/00* (2006.01)
(52) U.S. Cl. .................. 710/110; 710/112; 710/117; 710/124; 710/125; 710/37
(58) Field of Classification Search ............... 710/22, 710/27, 34, 61, 300, 107, 108, 109, 110, 710/4, 17, 25, 26, 37, 40, 112, 117, 118, 710/124, 125, 200
See application file for complete search history.

(56) References Cited

U.S. PATENT DOCUMENTS 6,393,506 B1* 5/2002 Kenny ......................... 710/113
6,493,775 B2 12/2002 Yamazaki et al.
6,754,786 B2 6/2004 Suzuki et al.
2004/0165101 A1 8/2004 Miyanari et al. ............. 348/363
2006/0236064 A1* 10/2006 Niles et al. ................... 711/170

FOREIGN PATENT DOCUMENTS

| JP | 5-334232 | 12/1993 |
|---|---|---|
| JP | 11-272606 A | 10/1999 |
| JP | 2004-260596 | 9/2004 |
| JP | 2006-189919 A | 7/2006 |

* cited by examiner

*Primary Examiner*—Niketa I Patel
*Assistant Examiner*—Jasjit S Vidwan
(74) *Attorney, Agent, or Firm*—Fitzpatrick, Cella, Harper & Scinto (57) ABSTRACT

An electronic apparatus includes a memory, first and second bus masters, a counting unit and a control unit. The first and second bus masters are capable of accessing the memory. The counting unit counts an amount of addresses reserved by the second bus master for accessing the memory. The control unit controls to avoid permitting a request made by the second bus master if a value counted by the counting unit becomes larger than a first threshold value, until the value counted by the counting unit becomes smaller than a second threshold value. The request made by the second bus master is used to reserve addresses of the memory, and the second threshold value is smaller than the first threshold value.

14 Claims, 8 Drawing Sheets

ELECTRONIC APPARATUS AND CONTROL METHOD

BACKGROUND OF THE INVENTION

1. Field of the Invention

The present invention relates to an electronic apparatus applicable to an image capture apparatus such as a digital camera, a digital video camera, or a portable telephone equipped with a camera.

2. Related Background Art

Conventionally, a CPU or a direct memory access (DMA) controller (referred to as DMAC, hereinafter) operates as a bus master to control a bus in many cases. Typically, the CPU operates as a bus master to occupy the bus. If the DMAC operates as a bus master, the DMAC transmits a bus request to the CPU. The CPU releases the bus upon reception of the bus request. Then, a bus use privilege (referred to as bus privilege, hereinafter) is transferred to the DMAC. As a result, the DMAC operates as a bus master. Conventionally, such the system has generally been employed to set the DMAC as a bus master (e.g., see Japanese Patent Application Laid-Open No. H05-334232).

However, when employing the above-mentioned system, unless the bus master transfers a bus privilege, another bus master cannot obtain the bus privilege, and the bus master that cannot obtain the bus privilege is set into a locked state. Thus, the above system is called an interlock system.

A recent progress in a multifunctional configuration of a system has been accompanied with connection of many bus masters to the system in addition to the CPU and the DMAC. Then, the other bus masters are locked during a period that a certain bus master occupies a bus. Thus, according to the above-mentioned system, the other bus masters must wait for access to the bus. In other words, a waiting time until the other bus masters can use the bus becomes longer.

To eliminate the waiting time until the bus can be used, a split bus transaction system has been generally employed. According to this split bus transaction system, an address phase and a data phase are separated from each other, and a plurality of bus masters reserve use of addresses for a slave device to be accessed in the address phase. Then, the plurality of bus masters access data of the slave device in asynchronously generated data phase.

By employing the split transaction system, it becomes possible to prevent a locked state of the bus master as much as possible without occupying the bus by a certain bus master. Accordingly, total bus efficiency (band width) can be increased more in the case of the split bus transaction system than that in the case of the interlock system.

However, in the split bus transaction system, for example, requests made from the plurality of bus masters to a synchronous dynamic random access memory (SDRAM) which is a bus slave are mixed in the address phase. Thus, the split bus transaction system is advantageous in that the bus privileges can be uniformly provided to the plurality of bus masters (locked state of a particular bus master is prevented). However, performance of the SDRAM is greatly reduced depending on the accessed state of the plurality of bus master, which is a problem.

Under those circumstances, the inventors of the present invention have conducted thorough studies on causes of a reduction in the performance of the SDRAM in case that the plurality of bus masters reserve addresses for the slave device in the address phase. The causes of the reduction in performance of the SDRAM will be described below.

(1) Case where Reading (Read) and Writing (Write) Alternately Occur in Access to SDRAM FIGS. 7A to 7D are timing charts each showing an example of operation timing in an SDRAM of a double data rate (DDR) type. The SDRAM of the DDR type can process data at both of leading and trailing edges of a clock signal. When a comparison is made with an SDRAM of a single data rate (SDR) type that performs processing data at one of leading edge and trailing edge of a clock signal, the data can be processed at a speed twice faster.

FIGS. 7A to 7D are timing charts when a burst length is set to 8 (BL=8) and column address strobe latency (CAS latency) is set to 2 (CL=2).

The timing charts of FIGS. 7A to 7D each show a case where an access is made to the same row address, and no precharging occurs. Depending on the access order, a timing gap may be generated during a time period from a current access to the next access.

Figure 7A:
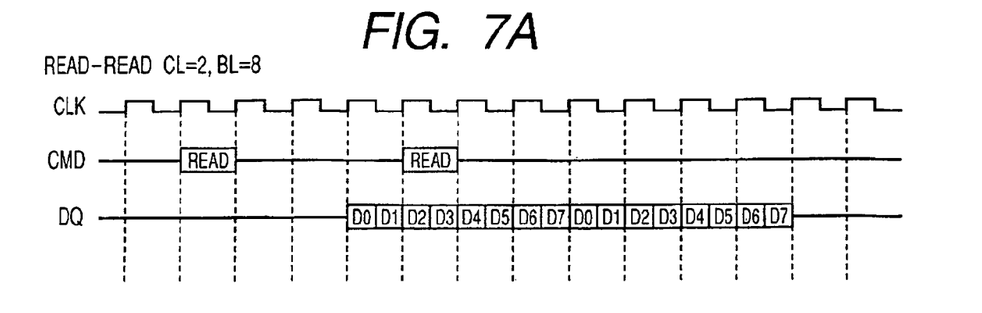
FIGS. 7A, 7B, 7C and 7D are timing charts each showing an example of operation timing in a general SDRAM of a DDR type.
Figure 7B:
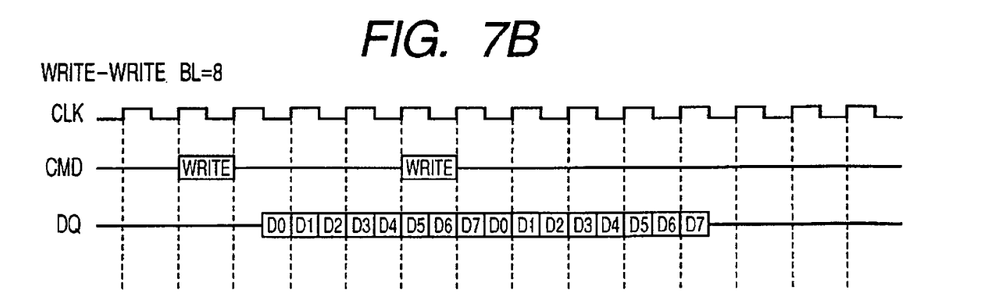

As shown in FIG. 7A, the timing gap is not generated when the Read command occurs subsequently to the Read command. As shown in FIG. 7B, the timing gap is not generated when the Write command occurs subsequently to the Write command.

Figure 7C:
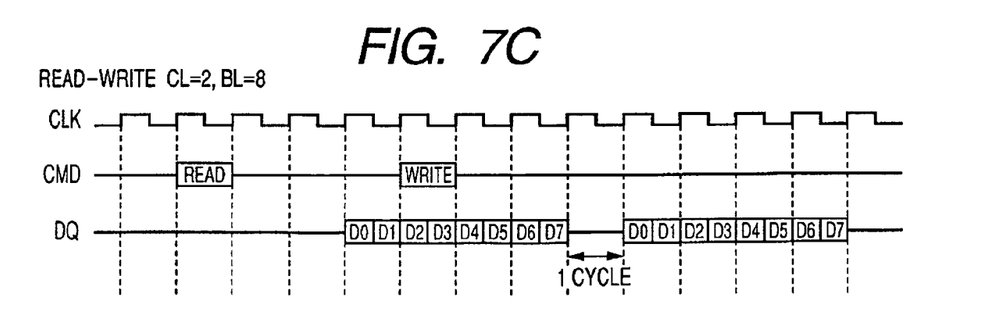
Figure 7D:
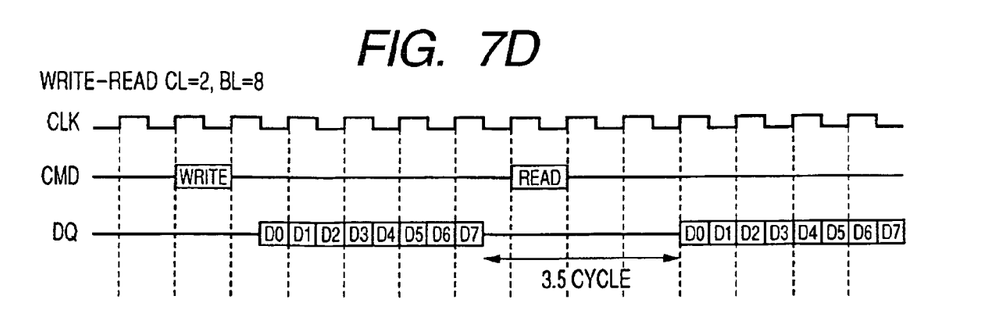

Contrary to this, as shown in FIG. 7C, the timing gap is 1 cycle when the Write command is issued subsequently to the Read command. As shown in FIG. 7D, the timing gap is 3.5 cycles when the Read command is issued subsequently to the Write command.

From the foregoing, it can be understood that the performance of the SDRAM becomes higher with less timing gap in the case of performing continuous access to the reading (Read) and the writing (Write).

(2) Case where Bank Conflict Occurs Upon Access to SDRAM

FIGS. 8A to 8D are timing charts each showing an example of operation timing in an SDRAM of a DDR type which needs precharging. FIGS. 8A to 8D also show the time charts, as in the case of FIGS. 7A to 7D, a bust length is set to 8 (BL=8) and CAS latency is set to 2 (CL=2).

According to the split bus transaction system, the plurality of bus masters access the SDRAM which is a bus slave. Owing to this, as shown in FIGS. 8A to 8D, there is a possibility in that access to different pages (row addresses) of the same bank (referred to as bank conflict, hereinafter) will increase. When such the access occurs, page closing (precharge to SDRAM) and page opening (active to SDRAM) become necessary. As a result, there may be possibility that a timing gap in bank conflict will greatly reduce transfer efficiency of the bus.

Figure 8A:
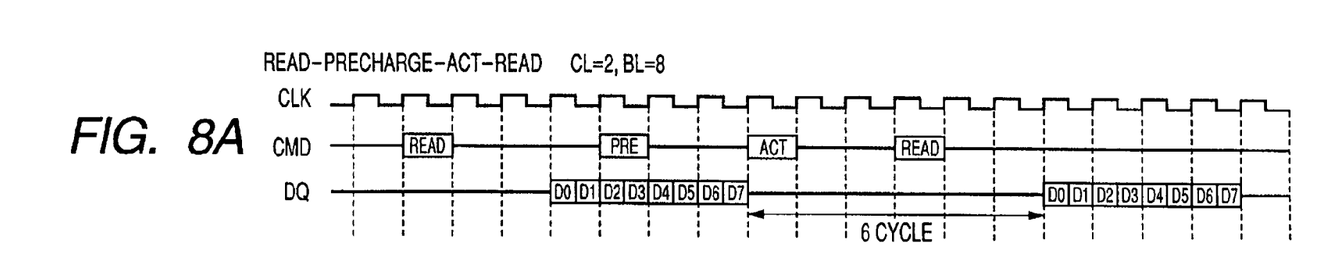
FIGS. 8A, 8B, 8C and BD are timing charts each showing an example of operation timing in an SDRAM of a DDR type which must be precharged.
Figure 8B:
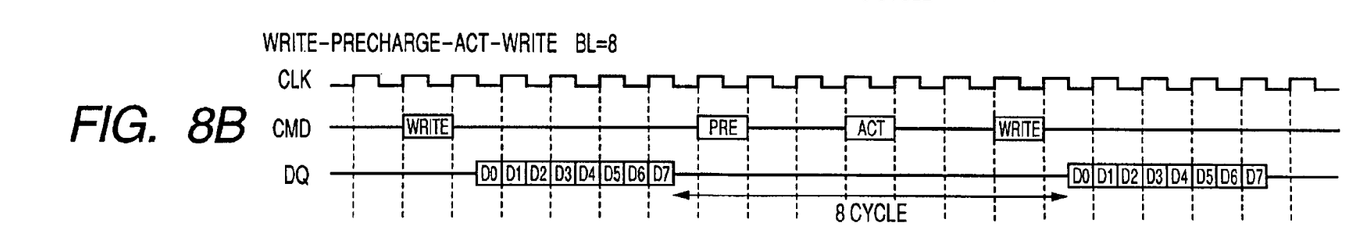

As shown in FIG. 8A, the timing gap is 6 cycles when a Read command, a Pre Charge command, an active (ACT) command, and a Read command are issued in this order. As shown in FIG. 8B, the timing gap is 8 cycles when the Write command, the Pre Charge command, the ACT command, and the Write command are issued in this order.

Figure 8C:
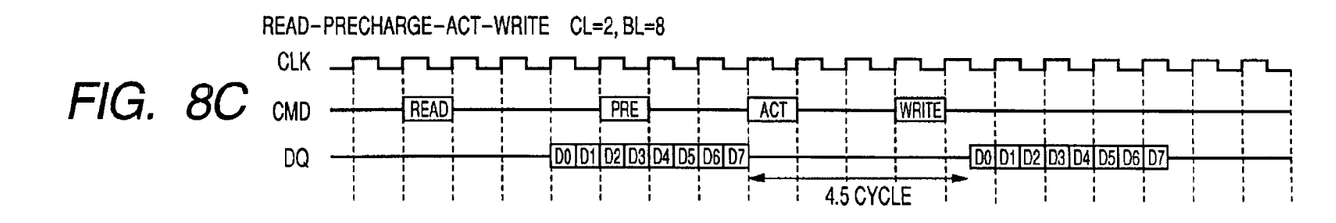
Figure 8D:
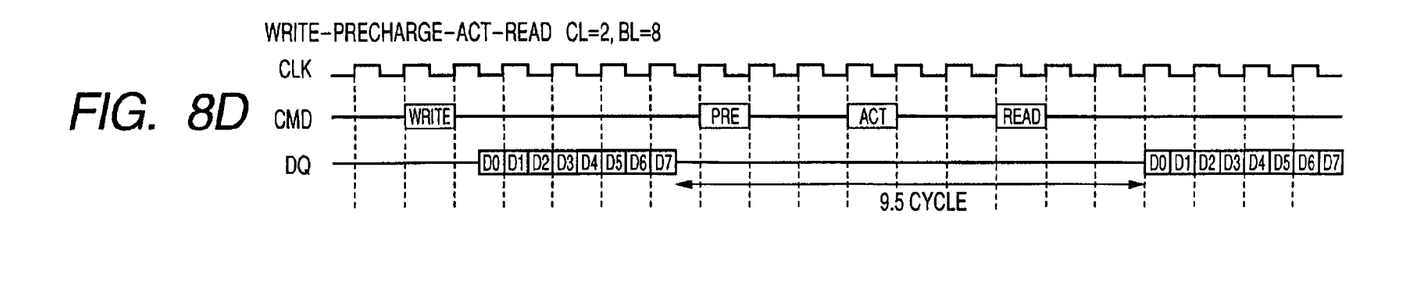

As shown in FIG. 8C, the timing gap is 4.5 cycles when the Read command, the Pre Charge command, the ACT command, and the Write command are issued in this order. As shown in FIG. 8D, the timing gap is 9.5 cycles when the Write command, the Pre Charge command, the ACT command, and the Read command are issued in this order.

Such the timing gap varies slightly depending on the types of the DRAM. Regarding the access to the SDRAM which needs precharging (Pre Charge), however, many timing gaps are typically necessary, and those timing gaps reduce the performance of the SDRAM.

In particular, in the SDRAM of the DDR type, the reduction in performance caused by the timing gap is conspicuous. If the burst length is set to 8 and the access the SDRAM of the DDR type is performed, the number of clock cycles necessary for one burst transfer is 4. Presuming that the continuous transfer of the reading (Read) or the writing (Write) where no bank conflict occurs is carried out, a band of substantially 100% can be obtained as a band width of the SDRAM.

However, if a timing gap of 1 cycle is generated during one burst transfer, the total number of clock cycles becomes 5 including 4-cycle access and the timing gap of 1 cycle. Hence, the band width is reduced by 20% (according to the timing gap ratio).

If the burst length is set to 8 and the access to the SDRAM of the SDR type is performed, the number of clock cycles necessary for one burst transfer is 8. Accordingly, the total number of the clock cycles becomes 9 when the timing gap of 1 cycle occurs, and the band width is reduced by about 11% (according to a timing gap ratio).

As described above, the data is accessed at a clock rate twice faster in the case of the SDRAM of the DDR type than that in the case of the SDRAM of the SDR type. However, nothing is different from the SDRAM of the SDR type in a command issuance period other than a data access period, and a period of the timing gap generation. Accordingly, expecting that a double band corresponding to the clock rate of the SDRAM of the DDR type is the highest performance band, a band loss of 1 cycle will be felt twice, i.e., the band loss of 2 cycles. Thus, a timing gap generated during access to the SDRAM is greatly affected by the performance of the SDRAM even in the case of 1 cycle.

Therefore, when an operation of high real timeness is intended to be secured, there has been a problem in that the reduction occurs in performance of the bus slave.

SUMMARY OF THE INVENTION

The present invention is to overcome the above-described drawbacks.

Another object of the present invention is to improve bus slave processing efficiency while securing, e.g., an operation of high real timeness.

According to an aspect of the present invention, an electronic apparatus comprises: a first and a second bus masters capable of accessing a memory controlled by a bus slave; a counting unit adapted to count an amount of address reserved by the second bus master for accessing the memory; and a control unit adapted to determine whether to avoid permitting a request made by the second bus master for reserving addresses of the memory or not, using a value counted by the counting unit and at least one threshold value.

According to another aspect of the present invention, a method of controlling an electronic apparatus, the electronic apparatus includes a first and a second bus masters capable of accessing a memory controlled by a bus slave, the method comprises the steps of: counting an amount of address reserved by the second bus master for accessing the memory; and determining whether to avoid permitting a request made by the second bus master for reserving addresses of the memory or not, using a value counted in the counting step and at least one threshold value.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the present invention and, together with the description, serve to explain the principles of the present invention.

DESCRIPTION OF THE PREFERRED EMBODIMENTS

Preferred embodiments of the present invention will be described in detail below with reference to the drawings.

Each of the embodiments described below will employ a digital camera as an example of an electronic apparatus. However, in place of the digital camera, an image capture apparatus such as a digital video camera or a portable telephone equipped with a camera can be employed.

First Embodiment

Figure 1:
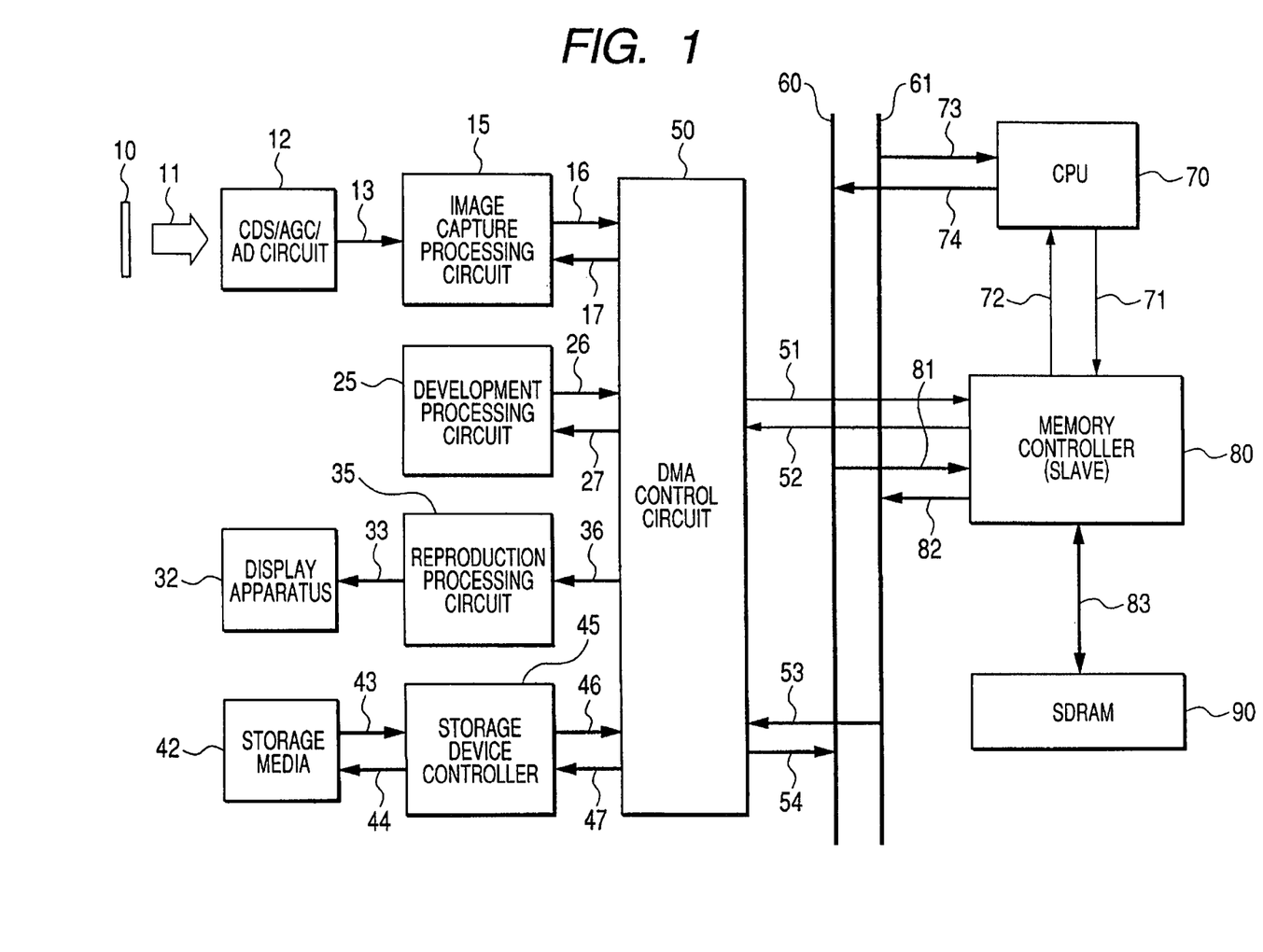
FIG. 1 is a diagram showing an example of a schematic configuration of a digital camera according to a first embodiment of the present invention.

FIG. 1 shows an example of a schematic configuration of a digital camera. A bus architecture of the embodiment is a split bus transaction system. According to this split bus transaction system, access to a bus slave is separated into an address phase and a data phase. A plurality of bus masters are provided as DMACs. The plurality of bus masters reserve use of addresses for the bus slave based on a result of arbitration. In data phase, data access is asynchronously carried out to the addresses reserved in the address phase according to a reservation order among the plurality of bus masters.

In FIG. 1, reference numerals 60 and 61 denote data buses. Reference numeral 60 denotes a read-only bus of data from an SDRAM 90. Reference numeral 61 denotes a write-only bus of data in the SDRAM 90. As in the case of the embodiment, the different data buses may be provided as read-only and write-only buses, or the same data bus may be used to serve both purposes. According to the embodiment of the invention, each of the data buses 60 and 61 serves both as a system bus of a CPU system and an image data dedicated bus. However, the two different data buses may be used as the system bus of the CPU system and the image data dedicated bus, respectively. Even when such the data buses are separated into two or more, a control system of the embodiment described below will not be changed at all.

Reference numeral 10 denotes an image capture device (charge coupled device (CCD), a CMOS image sensor, or the like) for converting an optical image of an object into an electric signal. Reference numeral 11 denotes an image capture signal generated by the image capture device 10. Reference numeral 12 denotes a CDS/AGC/AD circuit equipped with a correlated double sampling circuit (CDS) for removing noise from the image capture signal 11, an auto-gain control circuit (AGC) for amplifying the image capture signal 11 output from the CDS to a proper level, and an AD converter circuit (AD) for converting the image capture signal 11 output from the AGC into digital image capture data.

Reference numeral 13 denotes a data line for transmitting the image capture data output from the CDS/AGC/AD circuit 12. Reference numeral 15 denotes an image capture processing circuit for executing proper dark correction or shading correction for the image capture data. For example, the dark correction refers to correction of deterioration in image quality caused by dark current noise generated in the image capture device 11 or noise based on a pixel drop-out due to a very small defect unique to the image capture device 11, attained by correcting noise of a two-dimensional fixed pattern in image capture data obtained from real image capturing in an exposed state of the image capture device 11, by using image capture data obtained from image capturing in an unexposed state of the image capture device 11.

Reference numeral 16 denotes a transmission line for transmitting the image capture data corrected by the image capture processing circuit 15. Reference numeral 17 denotes a transmission line for transmitting dark data and executing dark correction processing at the image capture processing circuit 15. For example, this dark data is stored in the SDRAM 90.

Reference numeral 27 denotes a data line for transmitting the image capture data held in the SDRAM 90 after the dark correction or the like executed at the image capture processing circuit 15. Reference numeral 25 denotes a development processing circuit for executing development processing for the image capture data transmitted through the transmission line 27. Proper signal processing is executed at the development processing circuit 25. For example, the development processing circuit 25 executes compression processing or the like on the image capture data according to an image format of JPEG or the like to thereby generate development data.

Reference numeral 26 denotes a data line for transmitting the development data generated by the development processing circuit 25. Reference numeral 36 denotes a data line for transmitting the image capture data read from the SDRAM 90 to display an image on a display apparatus 32. Reference numeral 35 denotes a reproduction processing circuit for executing processing to display an image based on the image capture data transmitted through the data line 36. For example, the reproduction processing circuit 35 converts the image capture data into an image format of a video signal to generate proper image data. Reference numeral 33 denotes a data line for transmitting the image data generated by the reproduction processing circuit 35. Reference numeral 32 denotes the display apparatus for displaying an image based on the image data transmitted through the data line 33.

Reference numeral 42 denotes storage media such as a compact flash (registered trademark) card (CF card) or an SD card. Reference numeral 45 denotes a storage device controller for interfacing with the storage media 42. Reference numeral 43 denotes a data line for transmitting data read from the storage media 42. Reference numeral 44 denotes a data line for transmitting data to be written in the storage media 42. Reference numeral 46 denotes a data line for transmitting the data read from the storage media 42 by the storage device controller 45 to a DMA control circuit 50. Reference numeral 47 denotes a data line for transmitting the data to be written in the storage media 42, from the DMA control circuit 50 to the storage device controller 45.

Reference numeral 50 denotes the DMA control circuit for controlling direct memory access (DMA) to the image capture processing circuit 15, the development processing circuit 25, the reproduction processing circuit 35, the storage device controller 45, and the data buses 60 and 61. Reference numeral 51 denotes a data line for transmitting an address request signal sent from the DMA control circuit 50 to a memory controller 80, which is a bus slave, in address phase. This address request signal is a signal based on which the DMA control circuit 50 requests address use of the SDRAM 90 to the memory controller 80.

Reference numeral 52 denotes a data line for transmitting an acknowledge signal which is returned from the memory controller 80 as the bus slave to the DMA control circuit 50 with respect to the address request signal. Reference numerals 53 and 54 denote data lines for transmitting data in data phase. For example, the data line 53 transmits read data for reading the data stored in the SDRAM 90, and the data line 54 transmits write data for writing data in the SDRAM 90.

Reference numeral 70 denotes a CPU which exercises overall control of the digital camera of the embodiment. Reference numeral 71 denotes a data line for transmitting the address request signal transmitted from the CPU 70 to the memory controller 80 as the bus slave. Reference numeral 72 denotes a data line for transmitting the acknowledge signal which is returned from the memory controller 80 as the bus slave to the CPU 70 with respect to the address request signal. Reference numerals 73 and 74 denote data lines for transmitting data in data phase. For example, the data line 73 transmits read data for reading the data stored in the SDRAM 90, and the data line 74 transmits write data for writing data in the SDRAM 90.

Reference numeral 80 denotes the memory controller, which is a bus slave, for controlling the SDRAM 90. Reference numerals 81 and 82 denote data lines for transmitting data in data phase. For example, the data line 82 transmits read data for reading the data stored in the SDRAM 90, and the data line 81 transmits write data for writing data in the SDRAM 90. Reference numeral 83 denotes a data line for transmitting an address signal, data, and a control signal, between the SDRAM 90 and the memory controller 80. An SDRAM of a DDR type or a SDR type can be employed to the SDRAM 90.

Figure 2:
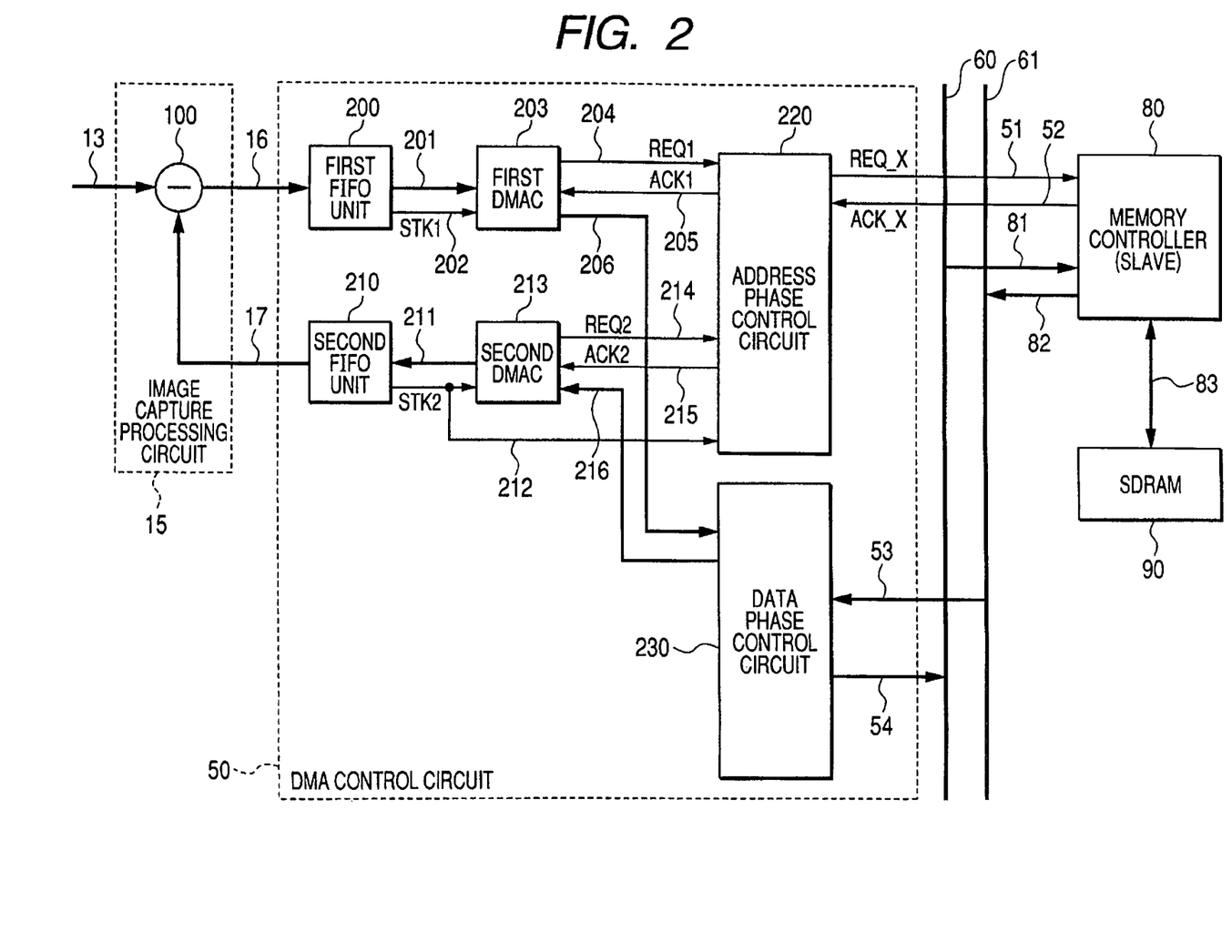
FIG. 2 is a diagram showing an example of a configuration of an image capture processing circuit and a DMA control circuit according to the first embodiment of the present invention.

FIG. 2 is a diagram showing an example of a configuration of the image capture processing circuit 15 and the DMA control circuit 50 shown in FIG. 1.

In the image capture processing circuit 15 of FIG. 2, reference numeral 100 denotes a subtractor for subtracting the dark data input from the SDRAM 90 through the data line 17 from the image capture data input from the CDS/AGC/AD circuit 12 through the data line 13. Accordingly, the image capture data is subjected to dark correction.

In the DMA control circuit 50, reference numeral 200 denotes a first first-in first-out (FIFO) unit for holding the image capture data input through the data line 16 after the execution of dark correction or the like at the image processing circuit 15. The first FIFO unit 200 has a capacity to store image capture data transferred to the SDRAM 90 by several times. Reference numeral 201 denotes a data line for transmitting the image capture data read from the first FIFO unit 200. Reference numeral 202 denotes a data line for transmitting a counter value STK1 of a counter which counts the stored amount of image capture data held in the first FIFO unit 200. Reference numeral 203 denotes a first DMAC which functions as a bus master to transfer the image capture data to the memory controller 80. The first DMAC 203 generates an address request signal REQ1 upon determination that the amount of transferable data has been stored in the first FIFO unit 200.

Reference numeral 204 denotes a data line for transmitting the address request signal REQ1 generated by the first DMAC 203. As a reply to the address request signal REQ1 generated by the first DMAC 203 which is a bus master, an acknowledge signal ACK1 is transmitted from the memory controller 80 as the bus slave to the first DMAC 203 through an address phase control circuit 220. Reference numeral 205 denotes a data line for transmitting the acknowledge signal ACK1. After the first DMAC 203 has input the acknowledge signal ACK1, data is transmitted from the first DMAC 203 as the bus master to the memory controller 80 as the bus slave. Reference numeral 206 denotes a data line for transmitting data sent from the first DMAC 203.

Reference numeral 216 denotes a data line for transmitting the dark data input from the SDRAM 90 to a data phase control circuit 230 through the memory controller 80, the data line 82, the data bus 61, and the data line 53 to a second DMAC 213. Reference numeral 211 denotes a data line for transmitting the dark data input to the second DMAC 213 to a second FIFO unit 210. Reference numeral 210 denotes the second FIFO unit for storing the dark data input from the SDRAM 90 through the memory controller 80, the data line 82, the data bus 61, the data line 53, the data phase control circuit 230, and the second DMAC 213.

Reference numeral 212 denotes a data line for transmitting a counter value STK2 of a counter which counts the amount of address reservations (referred to as address reservation amount, hereinafter) of the SDRAM 90 made by the second DMAC 210 to the address phase control circuit 220. Reference numeral 213 denotes the second DMAC which is a bus master for transferring the dark data input from the SDRAM 90 through the memory controller 80, the data line 82, the data bus 61, the data line 53, and the data phase control circuit 230 to the image capture processing circuit 15. The second DMAC 213 generates an address request signal REQ2 upon determination that the second FIFO unit 210 has a space to receive a data amount based on the counter value STK2.

Reference numeral 214 denotes a data line for transmitting the address request signal REQ2 generated by the second DMAC 213. As a reply to the address request signal REQ2 generated by the second DMAC 213 as the bus master, an acknowledge signal ACK2 is transmitted from the memory controller 80 as the bus slave to the second DMAC 213 through the address phase control circuit 220. Reference numeral 215 denotes a data line for transmitting the acknowledge signal ACK2. Needless to say, in the DMA control circuit 50, in addition to those shown in FIG. 2, many bus masters are present to be used for image capture development processing, and the like. Therefore, the DMA control circuit 50 not only has the bus masters for the image capture processing circuit 15 but also has bus masters for each one of the development processing circuit 25, the reproduction processing circuit 35 and the storage device controller 45. The DMACs including the same functions as the first DMAC 203 and the second DMAC 213 are employed to the bus masters for each one of the development processing circuit 25, the reproduction processing circuit 35 and the storage device controller 45.

Reference numeral 220 denotes the address phase control circuit for arbitrating the address request signals REQ1 and REQ2 generated by the first DMAC 203 and the second DMAC 213 which are bus masters in the DMA control circuit 50. Reference numeral 230 denotes a data phase control circuit for communicating with one of the first DMAC 203 and the second DMAC 213 as the bus masters based on a data phase asynchronously accessed from the memory controller 80 as the bus slave according to an address order received by the address phase control circuit 220.

Figure 3:
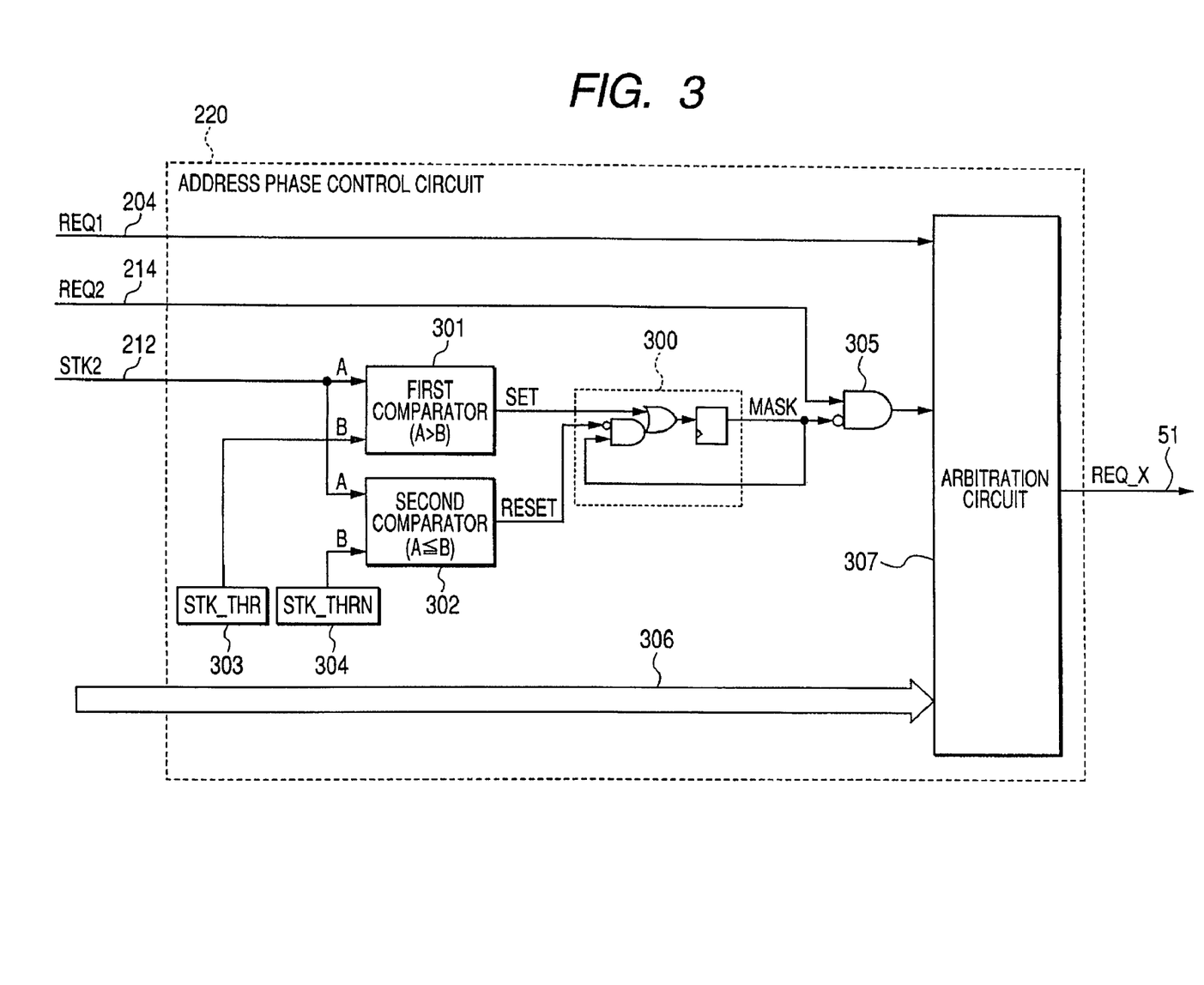
FIG. 3 is a diagram showing an example of a configuration of an address phase control circuit according to the first embodiment of the present invention.

FIG. 3 shows an example of a configuration of the address phase control circuit 220.

The address request signal REQ2 generated by the second DMAC 213 as the bus master is masked by a mask signal MASK. Masking-ON/OFF of the mask signal MASK is controlled by a mask control circuit 300. Reference numeral 301 denotes a first comparator for turning on masking. Reference numeral 302 denotes a second comparator for turning off the masking.

The masking-ON/OFF is controlled based on an address reservation amount counted by the second FIFO unit 210. There is a threshold level for turning ON/OFF masking. Reference numeral 303 denotes a threshold level STK_THR for turning on the masking. reference numeral 304 denotes a threshold level STK_THRN for turning off the masking. When the counter value STK2 of the counter which counts the address reservation amount in the second DMAC 210 exceeds the threshold level STK_THR, a set signal SET becomes active. Then, the mask control circuit 300 makes the mask signal MASK active. Accordingly, the address request signal REQ2 is masked. This mask state is held even when the counter value STK2 falls below a value of the threshold level STK_THR. To release the mask state, a value of the threshold level STK_THRN must be set equal to or less than the counter value STK2.

Reference numeral 305 denotes a gate circuit for masking the address request signal REQ2 by the mask signal MASK. Reference numeral 306 denotes a data line for transmitting a request signal from another bus master (DMAC) other than the address request signals REQ1 and REQ2. Therefore, request signals from the bus masters for each one of the development processing circuit 25, the reproduction processing circuit 35 and the storage device controller 45 are transmitted through the data line 306. Reference numeral 307 denotes an arbitration circuit for deciding a priority of requests from all the bus masters (DMAC). A result of deciding a request priority is output as a request signal REQ_X, which is to be transmitted through the data line 51, to the memory controller 80 as the bus slave. The priority can be set in advance. For example, when a higher priority is provided to the address request signal REQ2 than that to the address request signal REQ1, if the address request signals REQ1 and REQ2 are simultaneously generated, a request based on the address request signal REQ2 is selected. The selected request is output as a request signal REQ_X. A request based on the address request signal REQ1 is executed when the request based on the address request signal REQ2 is negated.

An example of control when dark correction processing is executed will be described below in detail.

According to the embodiment of the invention, data (dark data) captured in an unexposed state is prestored in the SDRAM 90 with proper timing before real exposure image capturing. The DMA control circuit 50 reads in advance the dark data stored in the SDRAM 90 therefrom before a shutter is opened to execute real exposure. Then, by using the read dark data, the image capture processing circuit 15 executes dark correction on data (real exposed data) captured in real exposure (subtraction is generally executed as described above). The image capture data on which the dark correction is executed is recorded in the same area where the dark data is stored in the SDRAM 90 in advance. Accordingly, a memory area can be saved by writing (overwriting) the data on which the dark correction is executed in the area of the dark data. Details of dark correction are described in Japanese Patent Application Laid-Open No. 2004-260596.

According to the embodiment of the invention, writing data into the SDRAM 90 during real exposure and reading of the dark data from the SDRAM 90 need to be carried out for a fixed period, preferably simultaneously, which requires to increase a bus band.

As the image capture data subjected to the dark correction is written in the same area of the dark data, similar bank access is highly likely to occur. When such the similar bank access occurs, bank conflict is induced to reduce performance of the SDRAM 90. Thus, according to the embodiment of the invention, by reducing the occurrence of bank conflict as much as possible and causing access for data reading/writing in the SDRAM 90 to be continued to a certain extent, the performance of the SDRAM 90 is improved more than ever before. An example of a control method to improve the performance of the SDRAM 90 as described above will be described in detail below.

During the real exposure, the image capture device 10 transmits a received image capture signal 11 to the CDS/AGC/AD circuit 12, and outputs AD-converted image capture data to the image capture processing circuit 15. The following setting is carried out in advance. The CPU 70 sets proper settings for an image capture mode in the image capture processing circuit 15. Next, the CPU makes the settings for the DMA control circuit 50. For arbitration setting, a highest priority is set for the second DMAC 213 which is a bus master and reads dark data. A priority of the first DMAC 203 is set lower than that of the second DMAC 213 for dark data reading. In the case of using another DMAC, a priority lower than those of the first DMAC 203 and the second DMAC 213 is set therefor.

A capacity of the first FIFO unit 200 with respect to the first DMAC 203 and a capacity of the second FIFO unit 210 with respect to the second DMAC 213 are each set to 128 bytes. A data width of the SDRAM 90 and bus widths of the data buses 60 and 61 each are set to 32 bits. Presuming that a capacity of the first FIFO unit 200 and a capacity of the second FIFO unit 210 with respect to the second DMAC 213 each are 128 bytes, and a transfer amount of one access to the SDRAM 90 is always 8-burst transfer, a transfer amount of 4 times (=128 [byte]÷(4 [byte]×8 [beat])) can be stored in the first FIFO unit 200 and the second FIFO unit 210.

Next, for example, 96 is set to a threshold value STK_THR to be compared with the address reservation amount STK2 of the DMAC 2, and 32 is set in STK_THRN. Then, settings are carried out to execute DMA of the DMAC 1 and the DMAC 1. For example, a start address for accessing the SDRAM 90, a total transfer amount of DMA, or the like is set. After such the settings are made, the DMAC 1 and the DMAC 2 are simultaneously started.

Figure 4:
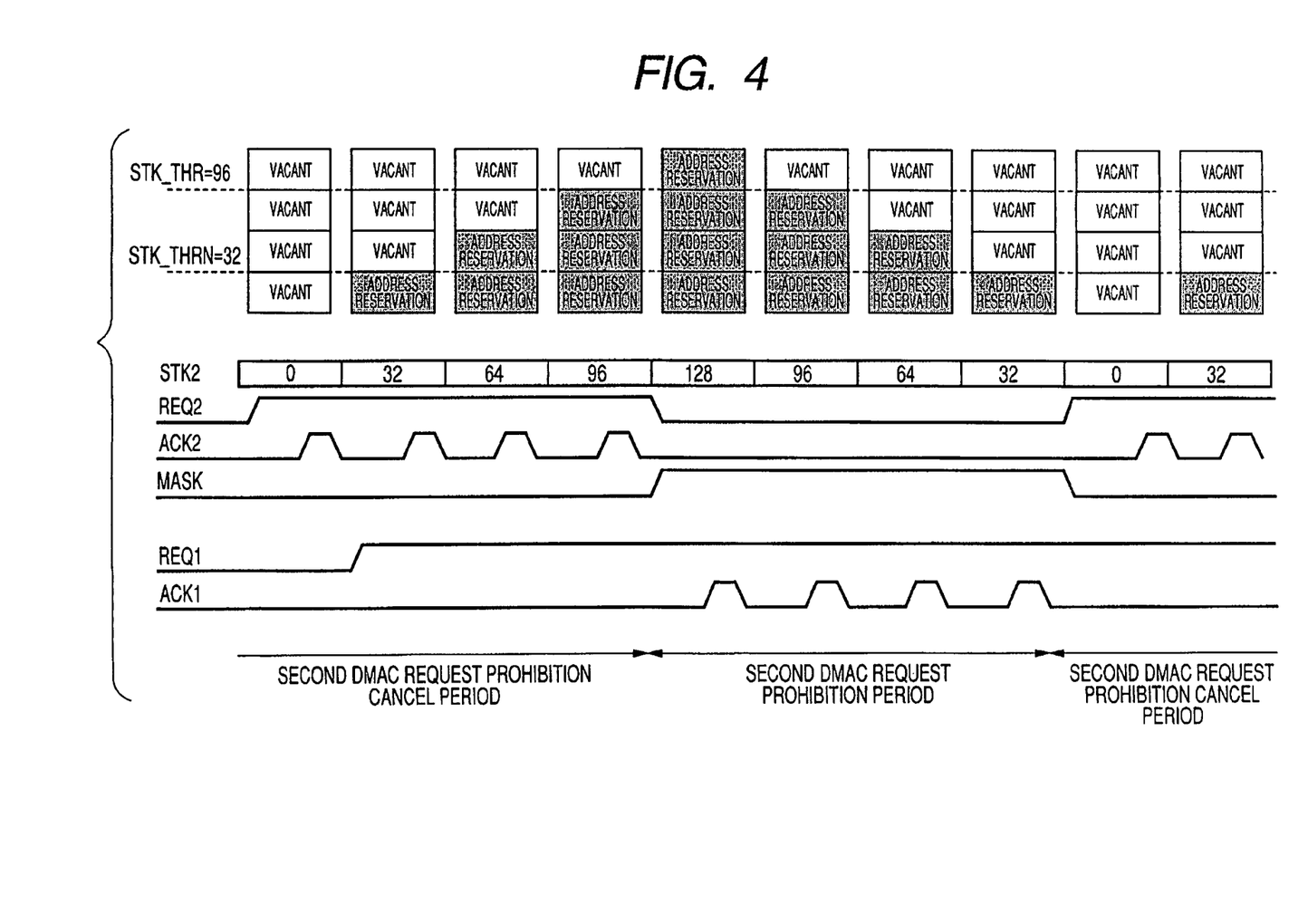
FIG. 4 is a conceptual diagram of timing by which a first DMAC and a second DMAC each issue address request signals in address phase according to the first embodiment of the present invention.

FIG. 4 is a conceptual diagram showing timing with which the first DMAC 203 and the second DMAC 213 issue address request signals in the address phase. When the first DMAC 203 and the second DMAC 213 are simultaneously started, the second DMAC generates an address request signal REQ2 since no dark data is stored in the second FIFO unit 210. At this time, a counter value STK2 indicating an address reservation amount of the second DMAC 213 is 0.

Also, an address request signal REQ1 is highly likely to have been generated from the first DMAC 203. However, the second DMAC 213 has the higher priority than the first DMAC 203 according to the arbitration set as described above. Accordingly, the address request signal REQ2 from the second DMAC 213 is preferentially selected. Hence, the address phase control circuit 220 transmits a request based on the address request signal REQ2 as a request signal REQ_X to the memory controller 80.

In FIG. 4, when the counter value STK2 of the counter which counts an address reservation amount of the second DMAC 210 is 96, the counter value STK2 is counted up to 128 upon reception of the address request signal REQ2. Presuming that a threshold level STK_THR for turning on the masking of the address request signal REQ2 is 96, the counter value STK2 exceeds the threshold level STK_THR. Thus, a mask signal MASK becomes valid, and the request based on the address request signal REQ2 is set in an issuance prohibited state.

In the prohibited state of the second DMAC 213, data are sequentially processed in the data phase of the second DMAC 213 to consume address reservation amount in the data phase (not shown). When all the address reservation amount of the second DMAC 213 is used up in this manner, the counter value STK2 of the counter that counts the address reservation amount becomes 0. Presuming that a threshold level STK_THRN for turning off the masking of the address request signal REQ2 is 32, the counter value STK2 falls below the threshold level STK_THRN. Then, the mask signal MASK is released to set the request based on the address request signal REQ2 of the second DMAC 213, into an issuance permitted state.

In the prohibited state of the request made from the second DMAC 213, the first DMAC 203 can issue an address reservation. In the example of FIG. 4, address reservations are successively made four times from the second DMAC 213, and in the prohibited state of the request made from the second DMAC 213, address reservations are successively made four times from the first DMAC 203.

Figure 5A:
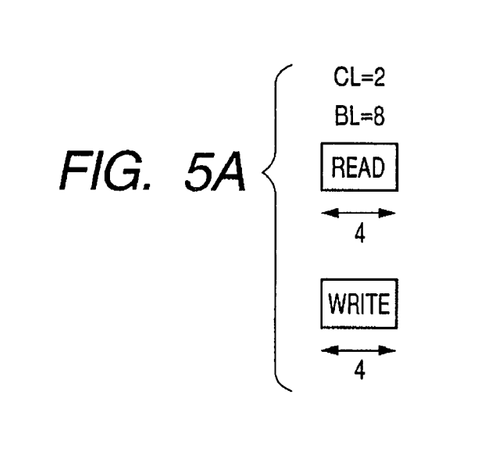
FIGS. 5A, 5B and 5C are diagrams each showing an example of a performance difference of an SDRAM based on an order of a read access made from the second DMAC and a write access made from the first DMAC according to the first embodiment of the present invention.
Figure 5B:
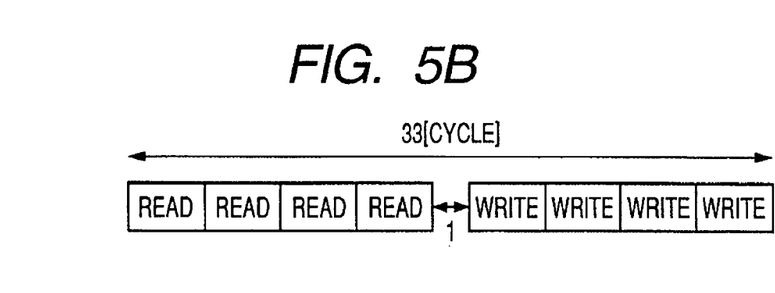
Figure 5C:
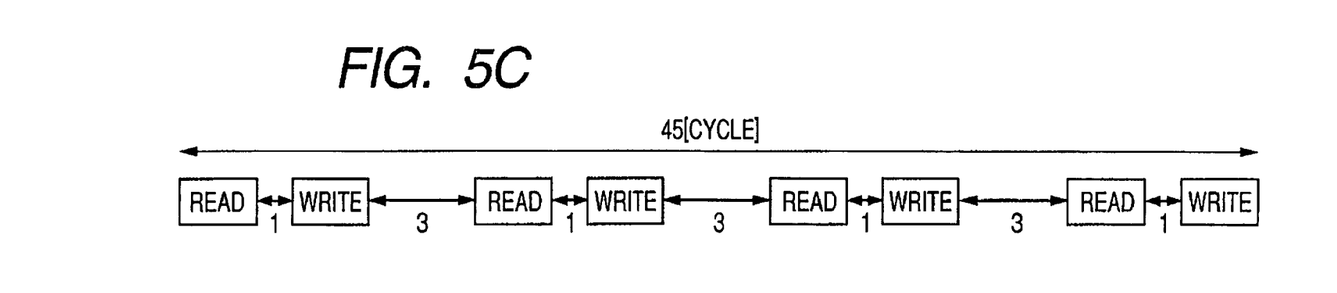

Each of FIGS. 5A to 5C is a conceptual diagram showing a change in the number of cycles necessary for accessing the SDRAM 90, which change is caused by a read access order from the second DMAC 213 and write access from the first DMAC 203. It is presumed that read access from the second DMAC 213 and write access from the first DMAC 203 occur four times each. It is also presumed that no bank conflict occurs, column address strobe latency (CAS latency) is 2 (CL=2), and a burst length is 8 (BL=8).

It can be understood from FIGS. 5A to 5C that 33 cycles are necessary for accessing the SDRAM 90 when write access continues four times following read access that continues four times, and 45 cycles are necessary for the SDRAM 90 when read access and write access are carried out always alternately. It can therefore be easily understood that performance of the SDRAM 90 is higher when the write access continues four times following the read access that continues four times.

The data of the SDRAM 90 accessed by the bus masters (first DMAC 203 and second DMAC 213) are distributed to continuous addresses because those data are mostly image data. In other words, as long as a specific DMAC (e.g., first DMAC 203 or second DMAC 213) accesses the SDRAM 90, bank conflicts occur with extremely low frequency. Thus, according to the embodiment of the invention, since a specific DMAC (e.g., first or second DMAC 203 or 213) successively accesses the SDRAM 90, bank conflicts can be reduced.

For example, as in the case of the embodiment, when read access (reading) and write access (writing) are carried out always alternately in the case of processing where image capture data subjected to dark correction is written in the storage area of the dark data (overwriting), and access always occurs in the same bank, the same row address of the same bank is highly likely to be accessed. Hence, precharge and active (ACT) commands are needed in many cases, which causes many timing gaps, leading to a reduction in performance of the SDRAM 90. According to the embodiment of the invention, such the situation can be prevented.

The first and second FIFO units 200 and 210 in the DMA control circuit 50 are resources necessary for reserving addresses in advance in split bus transaction. According to the embodiment of the invention, by controlling requests from the first DMAC 203 and the second DMAC 213 and priorities for the requests from the first DMAC 203 and the second DMAC 213 using the address reservation amounts of the first and second FIFO units 200 and 210 and a plurality of threshold levels STK_THR and STK_THRN optionally set for the address reservation amounts, access of the first DMAC 203 and the second DMAC 213, which are bus masters, to the memory controller 80, which is the bus slave, can be carried out continuously to a certain extent. Thus, access of the first DMAC 203 and the second DMAC 213 to the SDRAM 90 can be optimized (first DMCA 203 and second DMAC 213 can easily and efficiently access the SDRAM 90), and performance of image processing of the digital camera can be improved. Especially, it is possible to improve performance for dark correction processing on image capture data and to guarantee real timeness.

Second Embodiment

Next, a second embodiment of the present invention will be described.

According to the first embodiment, the issuance of the address request signal REQ2 from the second DMAC 213 for reading the dark data from the SDRAM 90 and the address request signal REQ1 from the first DMAC 203 for writing the image capture data subjected to the dark correction using the dark data into the SDRAM 90 is controlled by using the hardware. According to the second embodiment, however, issuance of address request signals REQ1 and REQ2 is controlled by using software. Thus, this embodiment is different from the first embodiment only in the issuance control of the address request signals REQ1 and REQ2, and portions similar to those of the first embodiment will be denoted by reference numerals similar to those shown in FIGS. 1 to 5C, and details description thereof will be omitted.

Figure 6:
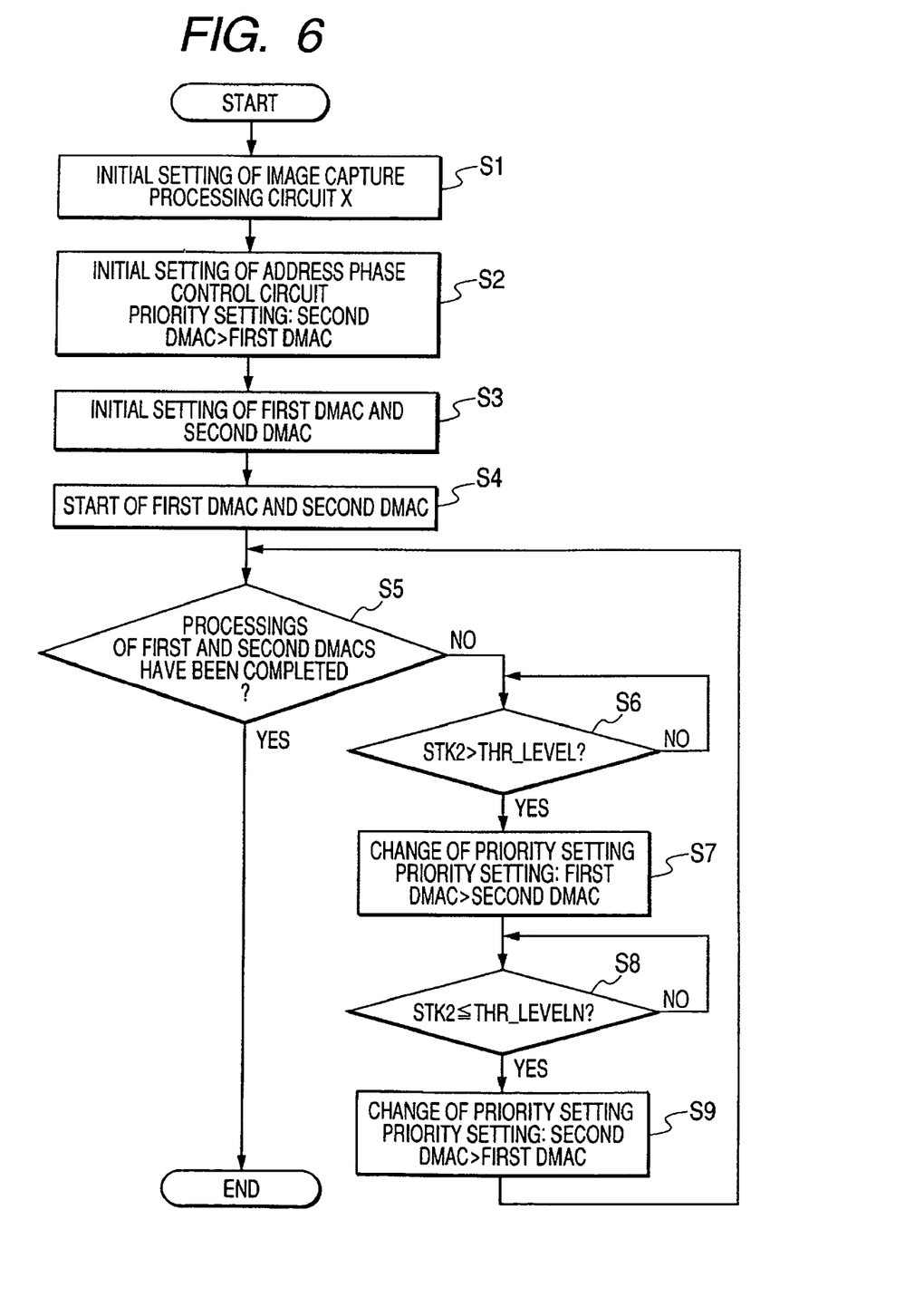
FIG. 6 is a flowchart showing an example of a processing operation of software of a digital camera when issuance of an address request signal is controlled according to a second embodiment of the present invention.

Referring to a flowchart of FIG. 6, description will be made of an example of a software processing operation of a digital camera of the embodiment when issuance of the address request signals REQ1 and REQ2 is controlled. Processing below can be realized by executing a control program stored in an ROM (not shown) by the CPU 70 shown in FIG. 1.

First, in step S1, initial setting is made for an image capture processing circuit 15.

Then, in step S2, priorities are set to requests which are based on the address request signals REQ1 and REQ2, so that the arbitration circuit 307 shown in FIG. 3 can decide priorities for the requests. In this case, it is presumed that the DMACs operating as bus masters are the first DMAC 203 and the second DMAC 213. A priority of the second DMAC 213 for reading dark data from an SDRAM 90 is set higher than that of the first DMAC 203 for writing image capture data subjected to the dark correction into the SDRAM 90 (shown as the second DMAC>the first DMAC in FIG. 6).

Next, in step S3, proper initial setting is made for the first DMAC 203 and the second DMAC 213. For example, a start address, a transfer size, or the like for execution of execute DMA is set.

Next, in step S4, the first DMAC 203 and the second DMAC 213 are started.

Then, in step S5, determination is made as to whether processing is ended in both of the first DMAC 203 and the second DMAC 213. If it is judged as a result of the determination that the processing has been completed in both of the first DMAC 203 and the second DMAC 213, all the processing operations are terminated.

On the other hand, if the processing has not been completed in at least either one of the first DMAC 203 and the second DMAC 213, the process proceeds to step S6 to wait until a counter value STK2 of a counter which counts an address reservation amount of the second DMAC 213 exceeds a threshold level THR_LEVEL. Then, after the counter value STK2 has exceeded the threshold level THR_LEVEL, the process proceeds to step S7 to reverse current priority setting. In the example of FIG. 6, a priority of the first DMAC 203 is set higher than that of the second DMAC 213 (shown as the first DMAC>the second DMAC in FIG. 6).

Next, in step S8, the process waits until the counter value STK2 of the counter which counts the address reservation amount of the second DMAC 213 falls blow a threshold level THR_LEVELN. After the counter value STK2 has fallen below the threshold level THR_LEVELN, the process proceeds to step S9 to reverse current priority setting. In the example of FIG. 6, a priority of the second DMAC 213 is set higher than that of the first DMAC 203 (shown as the second DMAC>the first DMAC in FIG. 6).

Then, returning to the step S5, the steps S5 to S9 are repeated until the processing is completed in both of the first DMAC 203 and the second DMAC 213.

In other words, permission and prohibition conditions of the address request signal REQ2 from the second DMAC 213 are always monitored by the CPU 70 using the counter value STK2 of the address reservation amount of the second DMAC 213. In the case of the prohibition condition of the counter value STK2, a priority of a request made from the first DMAC 203 is set higher than that of the second DMAC 213. In the case of the permission condition of the counter value STK2, a priority of the request made from the first DMAC 203 is set lower than that of the second DMAC 213. Thus, it is possible to control the issuance of the address request signals REQ1 and REQ2 by software processing.

Other Embodiments of the Invention

To operate various devices in order to realize the functions of the foregoing embodiments, a computer program for realizing the functions of the embodiments is supplied to a computer of an apparatus or in a system connected to various devices, and these devices are operated according to the program stored in the computer (CPU or MPU) of the system or the apparatus. This embodiment is also within the scope of the present invention.

In this case, the computer program itself realizes the functions of the embodiments, and the computer program itself and means for supplying the computer program to the computer, e.g., a recording medium for storing the computer program, constitute the present invention. For the recording medium to store the computer program, for example, a flexible disk, a hard disk, an optical disk, a magneto-optical disk, a CD-ROM, a magnetic tape, a nonvolatile memory card, an ROM, or the like can be used.

The functions of the embodiments are realized not only by executing the computer program supplied to the computer but also by cooperation of the computer program with an operating system (OS) or another application software operating on the computer. Needless to say, such a computer program is also within the embodiment of the present invention.

Furthermore, the supplied computer program is stored in a memory disposed in a function expansion board of the computer or a function expansion unit connected to the computer, and then a CPU or the like of the function expansion board or unit executes a part or all processing based on an instruction of the computer program, thereby realizing the functions of the embodiments. Needless to say, this case is also within the present invention.

The above-described embodiments are merely exemplary of the present invention, and are not be construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

This application claims priority from Japanese Patent Application No. 2005-070024 filed Mar. 11, 2005, which is hereby incorporated by reference herein.

What is claimed is:

1. An electronic apparatus comprising:
a memory;
first and second bus masters capable of accessing the memory;
a counting unit that counts an amount of addresses reserved by the second bus master for accessing the memory; and
a control unit that controls to avoid permitting a request made by the second bus master if a value counted by the counting unit becomes larger than a first threshold value, until the value counted by the counting unit becomes smaller than a second threshold value, wherein the request made by the second bus master is used to reserve addresses of the memory, and wherein the second threshold value is smaller than the first threshold value.

2. An electronic apparatus according to claim 1, wherein the first and second bus masters are capable of accessing the memory using a split bus transaction.

3. An electronic apparatus according to claim 1, wherein the electronic apparatus is one of a digital camera, a digital video camera and a portable telephone including a camera.

4. A method of controlling an electronic apparatus, wherein the electronic apparatus includes (a) a memory and (b) first and second bus masters capable of accessing the memory, the method comprising the steps of:
counting an amount of addresses reserved by the second bus master for accessing the memory; and
controlling to avoid permitting a request made by the second bus master if a value counted in the counting step becomes larger than a first threshold value, until the value counted in the counting step becomes smaller than a second threshold value, wherein the request made by the second bus master is used to reserve addresses of the memory, and wherein the second threshold value is smaller than the first threshold value.

5. A method according to claim 4, wherein the first and second bus masters are capable of accessing the memory using a split bus transaction.

6. A method according to claim 4, wherein the electronic apparatus is one of a digital camera, a digital video camera and a portable telephone including a camera.

7. An electronic apparatus comprising:
a memory;
first and second bus masters capable of accessing the memory;
a counting unit that counts an amount of addresses reserved by the second bus master for accessing the memory; and
a control unit that controls to permit a request made by the second bus master if a value counted by the counting unit becomes smaller than a second threshold value, until the value counted by the counting unit becomes larger than a first threshold value, wherein the request made by the second bus master is used to reserve addresses of the memory, and wherein the second threshold value is smaller than the first threshold value.

8. An electronic apparatus according to claim 7, wherein the control unit controls to avoid permitting the request made by the second bus master if the value counted by the counting unit becomes larger than the first threshold value, until the value counted by the counting unit becomes smaller than the second threshold value.

9. An electronic apparatus according to claim 7, wherein the first and second bus masters are capable of accessing the memory using a split bus transaction.

10. An electronic apparatus according to claim 7, wherein the electronic apparatus is one of a digital camera, a digital video camera and a portable telephone including a camera.

11. A method of controlling an electronic apparatus, the electronic apparatus including (a) a memory and (b) first and second bus masters capable of accessing the memory, the method comprising the steps of:
counting an amount of addresses reserved by the second bus master for accessing the memory; and
controlling to permit a request made by the second bus master if a value counted in the counting step becomes smaller than a second threshold value, until the value counted in the counting step becomes larger than a first threshold value, wherein the request made by the second bus master is used to reserve addresses of the memory, and wherein the second threshold value is smaller than the first threshold value.

12. A method according to claim 11, further comprising the step of:
controlling to avoid permitting the request made by the second bus master if the value counted in the counting step becomes larger than the first threshold value, until the value counted in the counting step becomes smaller than the second threshold value.

13. A method according to claim 11, wherein the first and second bus masters are capable of accessing the memory using a split bus transaction.

14. A method according to claim 11, wherein the electronic apparatus is one of a digital camera, a digital video camera and a portable telephone including a camera.

* * * * *